United States Patent [19]

Miller

[11] 4,402,182

[45] Sep. 6, 1983

[54] COMBINED INTERNAL COMBUSTION AND STEAM ENGINE

[76] Inventor: Hugo S. Miller, 4133 Caflur Ave., San Diego, Calif. 92117

[21] Appl. No.: 284,351

[22] Filed: Jul. 17, 1981

[51] Int. Cl.³ .............................................. F01B 29/04
[52] U.S. Cl. .................................... 60/712; 123/25 P; 123/25 C; 123/25 D; 123/25 K; 123/25 M
[58] Field of Search ............. 60/712; 123/25 B, 25 C, 123/25 D, 25 K, 25 M, 25 P, 193 H, 193 CH; 261/18 A

[56] References Cited

U.S. PATENT DOCUMENTS

| | | | |
|---|---|---|---|
| 3,074,228 | 1/1963 | Lee | 123/25 C |
| 4,122,803 | 10/1978 | Miller | 123/25 P |
| 4,281,626 | 8/1981 | Fishe | 123/25 C |
| 4,301,655 | 11/1981 | Thomas | 60/712 |

*Primary Examiner*—Allen M. Ostrager
*Assistant Examiner*—Stephen F. Husar

*Attorney, Agent, or Firm*—Brown & Martin

[57] ABSTRACT

An internal combustion engine in which a compact ring type boiler pack is installed at the top of each cylinder recessed into the cylinder head. Water is pumped through each boiler at a rate proportional to the cylinder temperature, to maintain a proper cooling and steam injection balance, the generated steam being injected peripherally into the cylinder during the last part of the power stroke, timed by the temperature in the boiler pack and the pressure in the cylinder. Boiler feed water is controlled by movement of the inlet valve actuating mechanism of the particular cylinder. The boiler provides multiple stage conversion of the water to steam, the peripheral steam injection providing internal cooling of the cylinder walls without interfering with normal combustion. The steam system is adaptable to existing internal combustion engines and results in reduced fuel consumption, very low pollutant emissions in the exhaust and a very efficient thermal cycle.

10 Claims, 6 Drawing Figures

COMBINED INTERNAL COMBUSTION AND STEAM ENGINE

BACKGROUND OF THE INVENTION

Water or steam injection systems for internal combustion engines are well known. Usually water is injected in atomized form through a nozzle in the cylinder head, or may be added to the combustible mixture. In some instances the water is heated to steam, which is then injected into the combustion chamber. Injection at or near the point of ignition lowers the initial mixture temperature and dilutes the combustible mixture at the time of ignition.

When the water is preheated, this is usually accomplished by applying a water jacket or flow path around the exhaust manifold, or some other hot portion of the engine. While this does use some of the excess engine heat, the cooling is not consistent and it is difficult to match the water or steam input to the requirements of the engine, particularly at low speeds. Further, most systems require extensive modification to existing engine designs, or even specially designed engines.

One particular engine which incorporates the basic principles of the present invention is disclosed in my prior U.S. Pat. No. 4,122,803, entitled Combined Internal Combustion and Steam Engine. The structure described therein requires modification of both the cylinder block and the head and is primarily adapted to air cooled engines.

SUMMARY OF THE INVENTION

The steam system described herein is adaptable to most existing types of internal combustion engines with a minimum of modifications, and provides a very efficient thermal cycle, with reduced fuel consumption and very low pollutant emissions for a given power output.

A boiler pack is attached to each cylinder of the engine in the form of a ring member surrounding the top of the cylinder and inset in the cylinder head, the head being locally cut away to receive the ring. In most engines there is sufficient material to permit the modification, the boiler ring being very small in cross section. The boiler ring injects steam into the combustion chamber through peripheral ports in the ring at the junction of the cylinder and head and incorporates a superheating stage to ensure complete conversion to steam, which makes the thermal characteristics more consistant and controllable.

In the installation in a water cooled engine as illustrated, water is supplied to the boiler under pressure from a pump which is controlled in response to leaving jacket water temperature, to maintain a balanced thermal flow. The water is injected in pulses timed to the opening of the inlet valve of one cylinder and injected into another cylinder which is in the start of the compression phase of the cycle. This is readily accomplished by a timed valve actuated by movement of the inlet valve rocker arm. A shut off valve, in series with the timing valve, is controlled by the vacuum mechanism of the engine to reduce the water supply to a spasmodic feed when the engine drops suddenly to low speed, as signified by a sudden increase in vacuum at the intake. This prevents excessive boiler feed and cooling at sudden reductions in engine speeds.

Injection of water into the boiler, which is part of the combustion chamber, effectively increases the compression ratio, but the reduced compression temperature allows the use of low octane fuel without detonation. By flashing the steam peripherally, the combustible mixture at the point of ignition is not diluted and ignition is unimpeded. However, the expanding flame front is quickly cooled by the water within the boiler ring, resulting in a reduced overall combustion temperature, particularly at the cylinder walls. This reduces heating of the cylinder structure, while the lower resultant combustion temperature minimizes the production of oxides of nitrogen in the exhaust. In effect this produces a lean burn condition following ignition of a combustible mixture of balanced fuel/air ratio, which itself need not be set excessively lean. This simplifies tuning of the engine, since some preset lean burn adjustment techniques now in use are extremely critical and difficult to maintain.

The combined internal combustion and steam engine has a very efficient thermal cycle. Much of the heat generated by combustion in the basic engine is used to heat water to produce the steam, which in turn lowers the combustion temperature. By treating the exhaust to condense and extract excess water vapor, some of the water can be recycled and the temperature of the exhaust gases reduced. Usually more water will be collected from the exhaust than is needed to sustain the steam cycle and this can be dumped as liquid, along with the contained contaminants.

The primary object of this invention, therefore, is to provide a new and improved combined internal combustion and steam engine.

Another object of this invention is to provide an internal combustion engine incorporating, at each cylinder, a boiler contained within the head structure and heated by the engine to flash and inject steam peripherally into the cylinder.

Another object of this invention is to provide an engine having steam injection timed to the engine operation and controlled in accordance with engine temperature and speed by very simple mechanism.

A further object of this invention is to provide a combined internal combustion and steam engine having a very efficient thermal cycle, with reduced fuel consumption and minimum exhaust pollutants for a given power output.

Still another object of this invention is to provide steam injection means which is adaptable to most existing types of internal combustion engines with minimum modification.

Other objects and advantages will be apparent in the following detailed description, taken in conjunction with the accompanying drawings, in which.

DESCRIPTION OF THE PREFERRED EMBODIMENT

Figure 1:
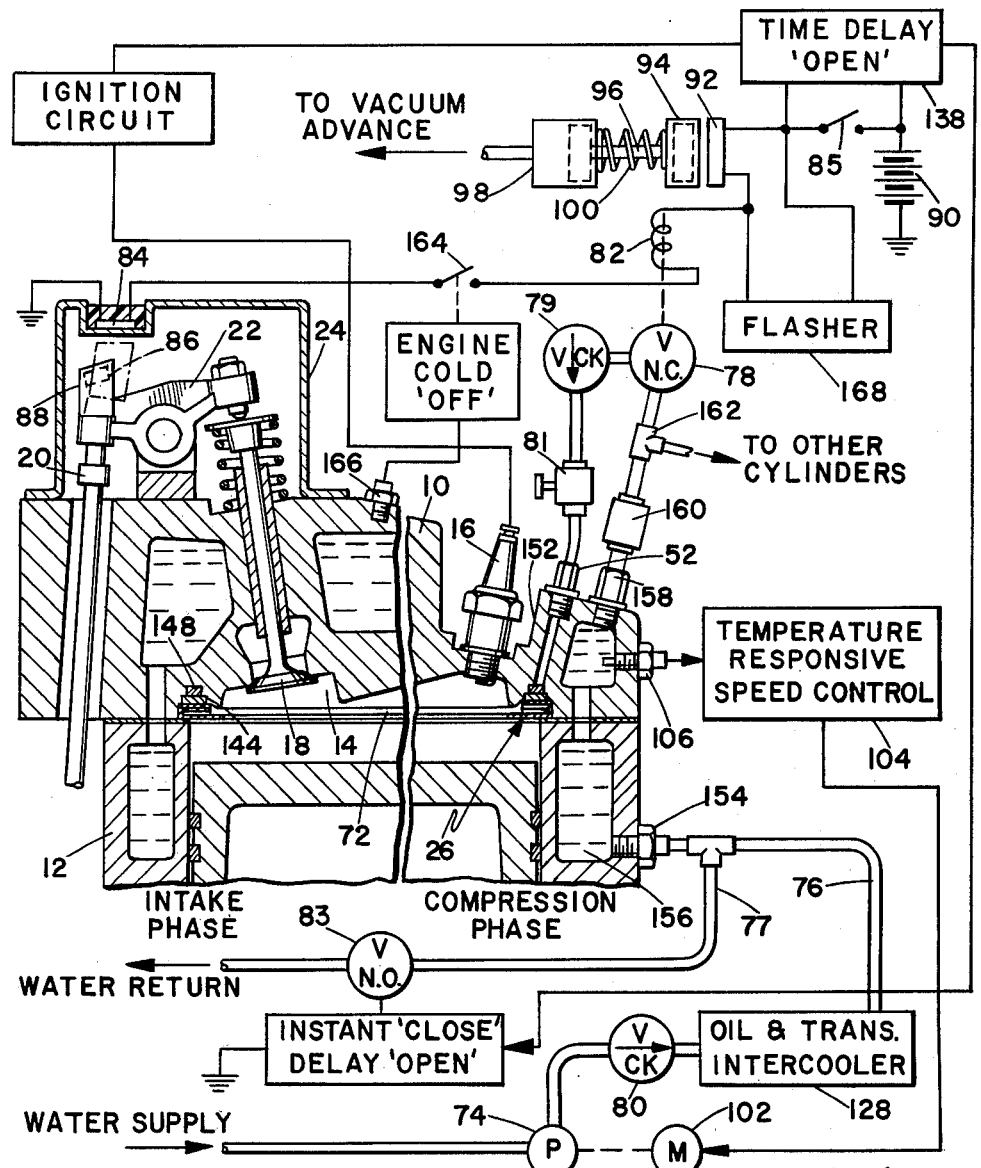
FIG. 1 is a diametrical sectional view of a typical internal combustion engine cylinder and head, showing the boiler installation and associated control system.

A single cylinder and head structure of a typical internal combustion engine is illustrated in FIG. 1, with the individual steam boiler for that head installed. As illustrated, the structure is for a water cooled engine, but could be adapted to air cooled engines.

A cylinder head 10 is mounted on the upper end of a cylinder 12 in an engine block, the head having a combustion chamber 14 with a spark plug 16 and an intake valve 18. The valve 18 is actuated by a push rod 20 through a rocker arm 22 in a conventional manner, the rocker arm being enclosed by a rocker cover 24.

A boiler pack 26 is installed at the top of the cylinder 12 inset in the head 10, which is milled out as necessary to receive the boiler pack. Many existing engines have sufficient material in their basic structure to accommodate the boiler pack, which is very thin and compact.

Figure 2:
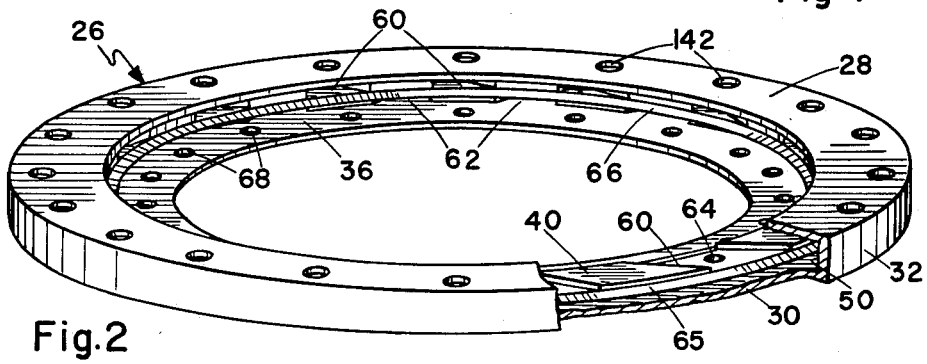
FIG. 2 is a perspective view, partially cut away, of the boiler ring.
Figure 3:
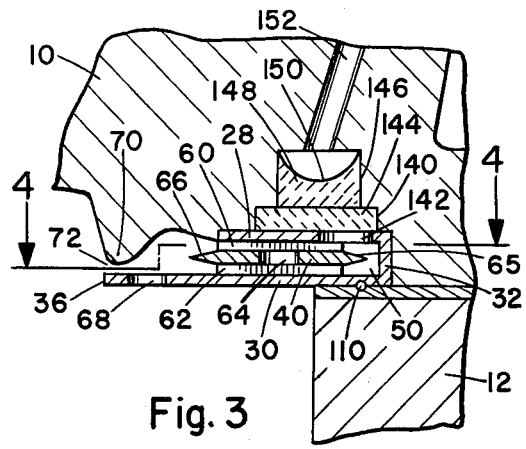
FIG. 3 is an enlarged view of a portion of FIG. 1, showing the structure of the boiler ring.
Figure 4:
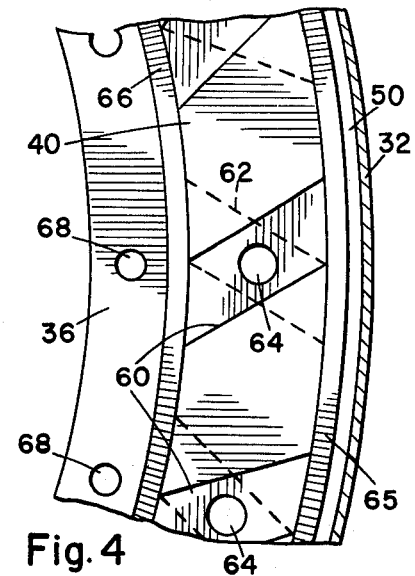
FIG. 4 is a sectional view taken on line 4—4 of FIG. 3.

The boiler pack, shown in detail in FIGS. 2, 3 and 4, is a hollow ring member having a flat upper ring 28 and a flat lower ring 30, joined at their outer edges by a cylindrical outer wall 32. the lower ring 30 has a radially inwardly projecting flange 36 extending beyond upper ring 28 across the peripheral portion of the cylinder. Fixed between rings 28 and 30 and substantially equally spaced therefrom is a circumferential superheat ring 40. Between the outer edge of superheat ring 40 and outer wall 32 is a circumferential distributing chamber 50.

The superheat ring 40 has a plurality of upper and lower ports 60 and 62, respectively, in the form of thin flat slots forming channels between the ring and the enclosing rings 28 and 30. Ports 60 and 62 are circumferentially spaced in vertically opposed pairs, the ports of each pair being inclined in opposite directions to the radius of the ring, to direct the steam into the cylinder with a swirling action. At the intersection of each pair of ports is a transfer hole 64 through the ring, as in FIGS. 3 and 4. Superheat ring 40 also has a peripheral tapered blade portion 65 projecting outwardly into distributing chamber 50, to split the flow through the ports 60 and 62, and an inwardly projecting tapered blade portion 66 extending just beyond the inner edge of ring 28 for smoothly mixing the combining flow from the ports. Flange 36 has a plurality of circumferentially spaced holes 68 therein adjacent the inner edge to increase the effective heat transfer of the ring portion. The outer edge of the combustion chamber 14 has a downwardly protruding lip 70, formed when the head is milled out for the boiler pack. Lip 70 is closely spaced above flange 36, forming a circumferential, inwardly opening injection slot 72. By installing the boiler pack within the head structure, almost the entire surface area of the ring member is in thermally conducting contact with the engine.

Immediately above the boiler ring and coextensive therewith is a distribution channel 140 cut into head 10, the upper ring 28 having circumferentially spaced holes 142 which communicate from the channel to the distributing chamber 50. Channel 140 is filled with a heat resistant porous distribution ring 144 of thermally conductive material such as sintered metal, to distribute incoming water evenly around the boiler ring. Above channel 140 is a receiving channel 146 containing a porous ring 148, which has a circumferential receiving groove 150 in the upper surface. Water is supplied to the boiler ring through an inlet passage 152 from the exterior of head 10 to the receiving groove 150. Porous ring 148 is preferably of coarse mesh for rapid dispersal of water around the ring, while the porous distribution ring 144 is of fine mesh to provide a controlled flow of water to the boiler ring.

Water from a suitable source is supplied through a pump 74 and a back flow preventing check valve 80 to a connection 154 in the cylinder jacket 156. A branch line 77 from supply line 76 leads through a normally open valve 83 to a suitable storage tank. Valve 83 closes when key switch 85 is turned on and opens to dump water to storage when the key switch turns the engine off. From an outlet 158 in the head 10, the water passes through a filter 160 to a distribution manifold 162 connected to all cylinders of the engine. From manifold 162, the water passes through an individual control valve 78 and check valve 79 to an inlet connector 52 seated in inlet passage 152. A balance cock 81 may be installed between each check valve 79 and inlet connector 52 for fine tuning of the water flow. Control valve 78, which is normally closed, is opened by a solenoid 82 in time with the engine cycle.

Installed in the rocker cover 24 is a magnetically actuated switch 84, such as a readily available mercury diaphragm switch, which is rigidly mounted in any suitable manner. A magnet 86 is attached to the rocker arm 22 on a support 88, so that each time the intake valve 18 opens, the magnet approaches and actuates switch 84, as indicated in the broken line position in FIG. 1. Switch 84 is connected through solenoid 82 to a battery 90, to open control valve 78 of the cylinder which is in the compression cycle each time the switch 84 is actuated by movement of the rocker arm. It should be noted that a mechanical connection between rocker arm 22 and control valve 78 could be used in place of the electrical system shown. Between switch 84 and solenoid 82 is a lock-out switch 164, actuated by a thermal sensor 166 in head 10 to hold the boiler off when the engine is cold.

To prevent flooding of the engine by excess water when speed is reduced, or during low speed running, the solenoid 82 is also controlled by a second magnetic shut off switch 92 is series with switch 84. Shut off switch 92 is held closed by a holding magnet 94 on the plunger 96 of a vacuum actuator 98. The plunger is biased by a spring 100 to keep holding magnet 94 in close proximity to switch 92. Actuator 98 is connected to the vacuum advance, or to an intake source of vacuum on the engine. When engine speed is reduced, the vacuum pull increases and the actuator 98 retracts plunger 96 and magnet 94 allowing switch 92 to open and de-energize solenoid 82. This closes valve 78 and shuts off the water supply to the boiler pack. A flasher 168 starts spasmodic operation of solenoid 82 if high vacuum persists longer than a predetermined time for the boiler feed to be shut off. When the engine speed picks up, vacuum is reduced and actuator 98 releases plunger 96, so that magnet 94 can close switch 92. Control valve 78 is then again responsive to control by switch 84.

Pump 74 is driven by a motor 102 which is controlled by a temperature responsive speed control 104, the basic arrangement being well known. A thermal sensor 106 is installed in the head water jacket next to outlet 158 to detect cylinder temperature and the speed control 104 adjusts the water flow rate accordingly to maintain proper heat balance. In a multi-cylinder engine, the speed control could respond to an average of all the sensors, or to the highest temperature cylinder, depending on the particular engine installation. The system could also control the balance cocks 18 in response to temperature distribution.

The boiler pack is sealed to cylinder 12 by an O-ring 110 between lower ring 30 and head gasket 112, and is sealed to head 10 by pressing into its machined channel against the sintered metal ring. The water passes around the porous ring 148 and the distribution ring 144 to the distributing chamber 50. The water will normally be converted to steam at this stage only after a drop in pressure in the cylinder or the middle portion of the power stroke when the water in the boiler pack flashes to steam and will pass through ports 60 and 62 of the superheat ring 40 to be injected into the cylinder through injection slot 72 and holes 68. If any liquid remains at the superheat ring, it will be momentarily trapped in transfer holes 64 and converted to steam. Ring flange portion 36, which extends into the cylinder and is subjected to the heat of combustion, becomes very hot and acts as a final liquid vaporizer. Heat from flange 36 is also conducted to the superheat ring 40 for maximum heating effect. In normal operation, only superheated steam would be injected into the cylinder, the final heating stages being used to accommodate temporary imbalance which may occur during substantial and abrupt speed changes in the engine.

While the system as illustrated is particularly adapted to water cooled engines, the basic system could be applied to an air cooled engine with a suitable supply of water. For maximum efficiency, a heat exchange system similar to the arrangement in FIG. 5 would be desirable. For a diesel engine, the spark plug and ignition system would be replaced by the usual injection means and the water pump pressure adjusted accordingly.

The basic fuel/air mixture drawn into the cylinder need not be critically lean, as in some engines set for lean burn to reduce exhaust pollution. The primary ignition takes place unimpeded and, as the flame front spreads outwardly, the superheated steam mixes with and cools the hot gases. Injection of the steam in a swirling action through the inclined ports of the superheat ring ensures good mixing with the hot gases in the cylinder during burning and after burning is completed. The steam adds to the volume of gases in the cylinder and effectively increases the compression ratio, but the cooling effect inhibits detonation. This allows the use of fuel of a lower octane rating than would normally be used with such a compression ratio. It should be noted that the water could include additives such as alcohol, or the like, according to the particular engine and performance characteristics. In addition to the cooling action in the combustion chamber, the engine is further cooled by the extraction of heat to convert the water to steam.

At starting, when the engine is cold and no steam is being generated, the compression ratio is very low and low octane fuel is satisfactory. As the engine heats up, the water is injected and fills the boiler rings and the compression ratio rises, but the cooling effect of the steam prevents detonation at the higher compression ratio. The reduced combustion temperature in the cylinder reduces production of hydrocarbons and oxides of nitrogen, which normally increase as combustion temperature rises.

Figure 5:
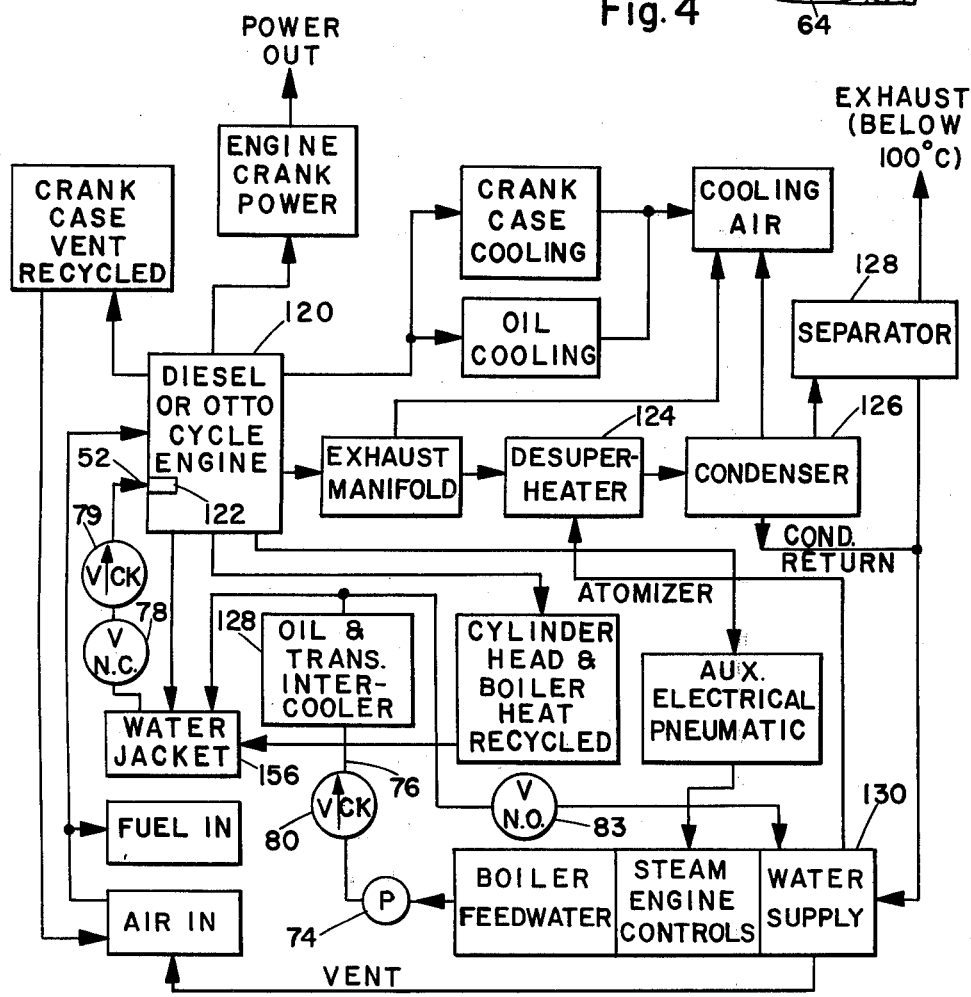
FIG. 5 is an energy flow diagram of the combined engine.

The thermal efficiency of the engine can be further improved by treating the exhaust, as indicated in the energy flow diagram in FIG. 5. Heat output of the engine 120 is partially recycled to heat the water in the boilers 122, the excess heat being carried off by cooling air in cooling the heads and cylinders. The exhaust is fed through a desuperheater 124, in which the steam rich exhaust is cooled by atomized water injection. The steam is condensed in a condenser 126, the water droplets are separated by a centrifugal separator and condensate is returned to the water supply tank 130. The condenser cooled feedwater is used to cool the oil and transmission fluid through suitable intercoolers 128 and thus begins to pick up heat on its return to the boiler system. This type of water cooling of exhaust gases and the associated apparatus are well known. The resultant exhaust products are below the temperature of the boiling point of water and have a very low content of pollutants. A time delay relay 138 in the ignition circuit allows the boilers to dry out prior to engine shut down, the drying out being rapid due to the small amount of water actually in the boilers. At the end of the delay, the engine stops and valve 83 opens to drain water to the supply and storage tank 130.

Figure 6:
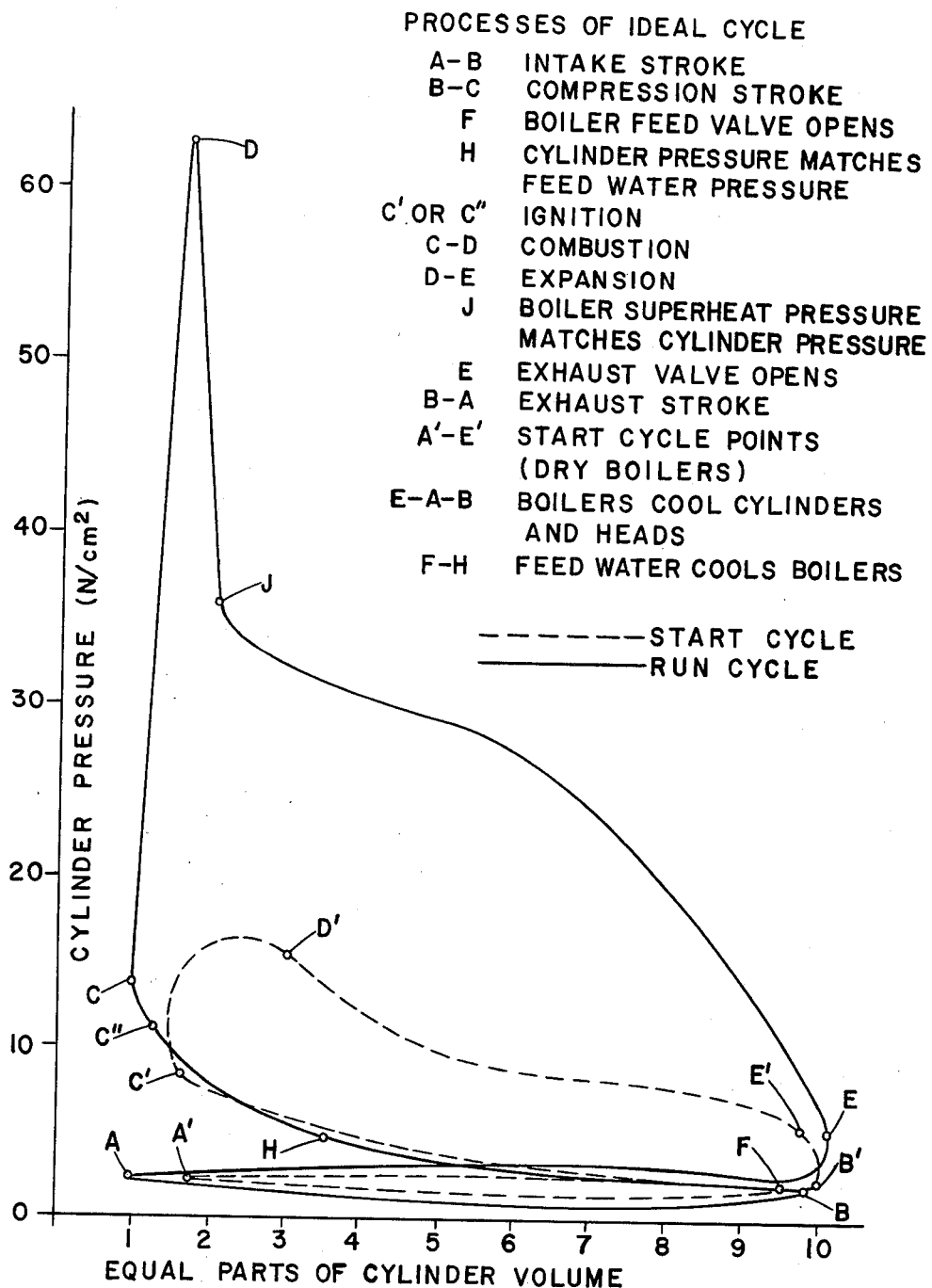
FIG. 6 is a graph showing the sequence of operations in an ideal cycle.

The graph illustrated in FIG. 6 represents the sequence of events in an ideal cycle of operation. The full path represents the normal operating cycle with the engine warm and the dashed line path shows the starting cycle with the engine cold. Starting at point A, the piston descends and the cylinder volume increases while the pressure drops, causing the combustible mixture to be drawn in for the intake stroke. From point B to point C the piston ascends, compressing the mixture and reducing cylinder volume. At point C the mixture is ignited, with combustion occurring from point C to point D, with a rapid rise in pressure. The piston is driven down as the gases expand from point D to point E, where the exhaust valve opens and the once more rising piston expels the gases to complete the cycle.

From point F to point H, the boiler feed water is below boiling point and cools the boilers, the boilers actually helping to cool the cylinders and heads between points E, A and B. At point F the boiler feed valve opens, then closes at a point close to point C after point H when the pressure in the cylinder matches the feed water pressures and the boiler charging matches the engine temperature cooling requirements. At this point some of the combustible mixture is being compressed into the superheat ring, where some of the low temperature steam formed during the pressure drop in the intake stroke actually condenses and allows the mixture to enter. During the rest of the compression stroke, the water in the superheat ring is heated rapidly, but does not form steam due to the rising pressure, so steam does not feed during the compression phase.

From the maximum pressure point D the pressure drops as the piston is driven down, until point J, where the boiler superheat pressure matches the cylinder pressure and the boiler begins to flash. Steam is then supplied to the cylinder for the remainder of the power stroke. As indicated in the graph, the injection of the steam reduces the rate of pressure drop and results in a better distribution of pressure through the complete power stroke. In addition the boiler action within the combustion chamber improves combustion and cooling of the exhaust products, so that formation of harmful nitrous oxides is reduced.

In a complete system such as a cogeneration power plant installation, essentially all of the heat which is not used by the engine to produce power leaves the engine as low pressure superheated steam, which can be used to produce heating or refrigeration at various levels in the system, which adds further to overall efficiency.

Having described my invention, I claim:

1. In combination with an internal combustion engine having at least one cylinder with an upper end, a head secured on the upper end of said cylinder, said head having a combustion chamber with ignition means and timed fuel inlet control means therein, the improvement comprising:

a thin, flat boiler pack recessed entirely within said head and held between the head and the confronting upper end of the cylinder, in thermally conducting engagement therewith;

said boiler pack comprising a hollow ring member having a circumferential water distributing chamber therein within the thickness of the ring member, with a water inlet having means for connection to a source of pressurized water;

said ring member having a substantially circumferential steam injection slot opening inwardly into said cylinder;

said ring member including a substantially flat upper ring and a substantially flat lower ring spaced therefrom, with a circumferential outer wall connecting the rings and enclosing said water distributing chamber, a superheat ring fixed between said upper and lower rings with steam conducting ports communicating therebetween from said chamber to said injection slot;

a control valve connected between said water inlet and the source of pressurized water;

and timing means actuated by said timed fuel inlet control means to open said control valve and release water into said distribution chamber when the cylinder is in the compression phase of the engine cycle.

2. The structure of claim 1, wherein said ports comprise upper and lower slots in said superheat ring, the slots being in opposed intersecting pairs includes in opposite directions to the radius, said superheat ring having an outer blade portion projecting outwardly into said chamber between the upper and lower slots and an inner blade portion projecting inwardly beyond the inner edge of said upper ring.

3. The structure of claim 2, and including a transfer hole through said superheat ring between and interconnecting each pair of slots.

4. The structure of claim 2, wherein said lower ring has an inner flange portion projecting beyond said upper ring across the periphery of the cylinder.

5. The structure of claim 4, wherein said combustion chamber has a peripheral lip spaced from said inner flange portion and defining said injection slot therebetween.

6. The structure of claim 5, wherein said inner flange portion has a plurality of holes therethrough adjacent the inner periphery.

7. The structure of claim 1, wherein said head has a circumferential distribution channel therein coextensive with at least a portion of said upper ring, the upper ring having openings therein communicating from said channel to said water distributing chamber, said channel containing a distribution ring of porous thermally conductive fluid conveying material, and said water inlet being connected to said channel.

8. The structure of claim 7, and including a receiving channel in said head coextensive with said distribution channel, said receiving channel containing a receiving ring of porous thermally conductive fluid conveying material in contacting engagement with said distribution ring, said receiving ring having a circumferential groove therein in communication with said water inlet.

9. The structure of claim 8, wherein said receiving ring is of coarser porosity than said distribution ring.

10. The structure of claim 1, wherein said timed fuel inlet control means includes an intake valve having a rocker arm operatively coupled thereto, said timing means including a magnet mounted on said rocker arm, and a magnetically actuated timing switch mounted adjacent the rocker arm to be operated by the magnet each time the rocker arm moves to open the intake valve;

said control valve having an actuating solenoid, said timing switch being connected to said solenoid and to a source of power;

a magnetically actuated shut off switch in series with said timing switch, a holding magnet movably mounted adjacent the shut off switch, shut off means actuated by a sudden reduction in engine speed to withdraw the holding magnet from the shut off switch;

and a flasher circuit coupled across said shut off switch for spasmodic operation of said solenoid when the shut off switch is off in excess of a predetermined duration.

* * * * *